(12) United States Patent
Hird

(10) Patent No.: US 9,477,830 B2
(45) Date of Patent: Oct. 25, 2016

(54) CONTROLLED AND CLIENT-SIDE AUTHENTICATION MODULE

(75) Inventor: Geoffrey Hird, Cupertino, CA (US)

(73) Assignee: CA, INC., New York, NY (US)

( * ) Notice: Subject to any disclaimer, the term of this patent is extended or adjusted under 35 U.S.C. 154(b) by 859 days.

(21) Appl. No.: 12/272,205

(22) Filed: Nov. 17, 2008

(65) Prior Publication Data

US 2009/0165109 A1 Jun. 25, 2009

Related U.S. Application Data

(60) Provisional application No. 60/988,502, filed on Nov. 16, 2007.

(51) Int. Cl.
| | |
|---|---|
| *G06F 21/00* | (2013.01) |
| *G06F 21/33* | (2013.01) |
| *H04L 9/06* | (2006.01) |
| *H04L 9/32* | (2006.01) |

(52) U.S. Cl.
CPC ............. *G06F 21/33* (2013.01); *H04L 9/0631* (2013.01); *H04L 9/3226* (2013.01); *H04L 9/3263* (2013.01); *H04L 2209/60* (2013.01)

(58) Field of Classification Search
CPC ..... G06F 21/33; G06F 21/32; G06F 21/6245
USPC ............................................................ 726/7
See application file for complete search history.

(56) References Cited

U.S. PATENT DOCUMENTS

| | | | |
|---|---|---|---|
| 5,928,363 A | 7/1999 | Ruvolo | |
| 6,910,136 B1 | 6/2005 | Wasserman et al. | |
| 7,020,645 B2 | 3/2006 | Bisbee et al. | |
| 7,100,049 B2 | 8/2006 | Gasparini et al. | |
| 7,200,576 B2 | 4/2007 | Steeves et al. | |
| 7,263,205 B2 | 8/2007 | Lev | |
| 7,266,693 B1 | 9/2007 | Potter et al. | |
| 2005/0066037 A1 * | 3/2005 | Song et al. | 709/227 |
| 2005/0235351 A1 * | 10/2005 | Seltzer et al. | 726/14 |
| 2007/0022473 A1 | 1/2007 | Hird | |

(Continued)

OTHER PUBLICATIONS

B. Parno, C. Kuo and A. Perrig, "Phoolproof Phishing Prevention," Proc. Financial Cryptography and Data Security, Springer-Verlag, 2006, pp. 1-19.*
Vassilev, A.T.; du Castel, B.; Ali, A.M.; , "Personal Brokerage of Web Service Access," Security & Privacy, IEEE , vol. 5, No. 5, pp. 24-31, Sep.-Oct. 2007.*
Zhao, Li, et al. "Anatomy and performance of SSL processing." Performance Analysis of Systems and Software, 2005. ISPASS 2005. IEEE International Symposium on. IEEE, 2005.*

(Continued)

*Primary Examiner* — Syed Zaidi
(74) *Attorney, Agent, or Firm* — Vierra Magen Marcus LLP

(57) ABSTRACT

A computerized method of accessing a secure resource using an application associated with a user's computing device is provided. The application is programmed, in part, to monitor user browsing activity and wherein the application has associated therewith one or more predefined Uniform Resource Locaters (URLs) to trusted sites, each having an associated trusted root certificate and security key. The method includes the application detecting a user attempt to log into a secure resource, the application scanning in-process browser processes to identify a browser process that is in a login state, the application associating the browser process in a login state with one of the trusted sites, the application initiating a new browser session with the trusted site using the associated predefined URL, the application obtaining a login password from the user, the application supplying to the trusted site the associated security key and login password, and the user's computer displaying subsequent browsing activity.

18 Claims, 2 Drawing Sheets

(56) References Cited

U.S. PATENT DOCUMENTS

2007/0174338 A1 7/2007 Liggett
2007/0245027 A1* 10/2007 Ghosh et al. ............. 709/228
2007/0250885 A1 10/2007 Ohashi
2008/0028444 A1* 1/2008 Loesch et al. ............. 726/4

OTHER PUBLICATIONS

CRYTPOcard DoS issue, Chongo (113939) Nov. 3, 2004, printed from website on Sep. 14, 2005 (3 pages) http://ask.slashdot.org/comments.pl?sid=23189&cid=2515877.

Office Action for U.S. Appl. No. 11/187,602, mailed on Jan. 13, 2009.
Office Action for U.S. Appl. No. 11/187,602, mailed on Jun. 19, 2009.
Notice of Allowance for U.S. Appl. No. 12/272,489, mailed on Apr. 21, 2011.
RSA Security Inc., "RSA SecurID® Authentication, A Better Value for a Better ROI," Mar. 2005, 12 pages, http://web.archive.org/web/20050302105826/http://www.infosysinc.com/MRC/content/IT%20Security/RSA/SecurIDROI.pdf.

* cited by examiner

CONTROLLED AND CLIENT-SIDE AUTHENTICATION MODULE

CROSS-REFERENCES TO RELATED APPLICATIONS

This application is a non-provisional of, and claims the benefit of, U.S. Provisional Patent Application No. 60/988,502, filed Nov. 16, 2007, entitled "Controlled Client-Side Authentication Module," the entirety of which is herein incorporated by reference for all purposes.

This application is related to U.S. patent application Ser. No. 12/272,489 filed Nov. 17, 2008, issued as U.S. Pat. No. 8,015,598 on Sep. 6, 2011, which is a non-provisional of, and claims the benefit of, U.S. Provisional Patent Application No. 60/988,526, filed Nov. 16, 2007, entitled "Two-Factor Anti-Phishing Authentication Systems And Methods," and also to U.S. patent application Ser. No. 11/187,602, filed Jul. 21, 2005, issued as U.S. Pat. No. 8,490,169 on Jul. 16, 2013, entitled "Server-Token Lockstep Systems And Methods," the entirety of which applications are incorporated herein by reference for all purposes.

FIELD OF THE INVENTION

Embodiments of the present invention relate generally to electronic security. More specifically, embodiments of the present invention relate to systems and methods to protect electronic resources by thwarting fraudulent attempts to gain access thereto.

BACKGROUND OF THE INVENTION

With the widespread use of the Internet, attempts to defraud people have also increased. Thus, it is vital to develop strong authentication techniques. Two prevalent fraud attempts are phishing and man-in-the-middle (MITM) attacks. Phishing involves the non-real-time collection of usernames and passwords and other sensitive data. These data could later be used by the attacker to defraud users. MITM can be described as phishing plus real-time proxying. Others have attempted to combat phishing and MITM attacks, as discussed in the following examples. Note in each that the user is ultimately required to exercise judgment. Hence, the user allows his or herself to fall victim to the attack.

Hardware cryptography, for instance, is an inadequate solution because users are required to make judgments about whether their browsers are connected to a server over SSL, whether a certificate has the proper name on it, and whether the trusted root certificates are indeed trustworthy. Some operators of secure servers repeatedly warn their users not to disclose passwords and caution that their staffs will not ask users to reveal passwords.

Another popular attempt requires users to choose pictures, and a user's selection is stored in the user's profile. When the user accesses the related secure server, the user is requested to look for his or her picture and end the session if he or she does not see it. But many users continue without seeing their picture. Moreover, real time proxying can be used to circumvent this type of security, because again, the user is required to make a judgment.

Temporary password solutions, wherein an application or the like provide a user with passwords in synchrony with the server, also may be defeated via MITM attacks. This is also the case because the user has to judge whether a web site is the legitimate one or a fake one.

Other attempted solutions include plugins or other browser enhancements that alert users to known fraudulent sites. Such solutions do not aid roaming users and are powerless against "new" fraudsters. Hence, improvements are needed.

SUMMARY OF THE INVENTION

Embodiments of the present invention provide a computerized method of accessing a secure resource using an application associated with a user's computing device. The application is programmed, in part, to monitor user browsing activity and wherein the application has associated therewith one or more predefined Uniform Resource Locaters (URLs) to trusted sites, each having an associated trusted root certificate and security key. The method includes the application detecting a user attempt to log into a secure resource, the application scanning in-process browser processes to identify a browser process that is in a login state, the application associating the browser process in a login state with one of the trusted sites, the application initiating a new browser session with the trusted site using the associated predefined URL, the application obtaining a login password from the user, the application supplying to the trusted site the associated security key and login password, and the user's computer displaying subsequent browsing activity.

In some embodiments the application kills preexisting browser processes. The security key may be an Advanced Encryption Standard (AES) cipher. The security key may be a Triple Data Encryption Standard (TDES) cipher. The application scanning in-process browser processes to identify a browser process that is in a login state and associating the browser process in a login state with one of the trusted sites may include the application identifying in-process browser processes; the application identifying URL and page source content of each process; and the application preserving state information for at least the browser process in a login state.

Other embodiments provide a computer-readable medium having stored thereon computer-executable instructions. The instructions have associated therewith one or more predefined Uniform Resource Locaters (URLs) to trusted sites, each having an associated trusted root certificate and security key. The instructions program an associated computing device to: monitor user browsing activity to thereby detect a user attempt to log into a trusted site; scan in-process browser processes to identify a browser process that is in a login state; associate the browser process in a login state with one of the trusted sites; initiate a new browser session with the trusted site using the associated predefined URL; obtain a login password from the user; and supply to the trusted site the associated security key and login password to thereby allow the user access.

The instructions may also program the computing device to kill preexisting browser processes. The security key may be an Advanced Encryption Standard (AES) cipher. The security key may be a Triple Data Encryption Standard (TDES) cipher. The instructions, in programming the computing device to scan in-process browser processes to identify a browser process that is in a login state and associate the browser process in a login state with one of the trusted sites, may program the computer to: identify in-process browser processes; identify URL and page source content of each process; and preserve state information for at least the browser process in a login state.

Still other embodiments provide a computer-implemented method for securely accessing online resources. The method includes providing an application for execution on a user computer. The application has associated therewith one or more predefined Uniform Resource Locaters (URLs) to trusted sites, each having an associated trusted root certificate and security key. The methods also includes a user executing the application on the user computer; the application monitoring user browsing activity; the application detecting a user attempt to log into a secure resource; the application scanning in-process browser processes to identify a browser process that is in a login state; the application associating the browser process in a login state with one of the trusted sites; the application initiating a new browser session with the trusted site using the associated predefined URL; the application obtaining a login password from the user; the application supplying to the trusted site the associated security key and login password; and the user's computer displaying subsequent browsing activity.

In some embodiments, the application kills preexisting browser processes. The security key may be an Advanced Encryption Standard (AES) cipher. The security key comprises a Triple Data Encryption Standard (TDES) cipher. The application scanning in-process browser processes to identify a browser process that is in a login state and associating the browser process in a login state with one of the trusted sites may include: the application identifying in-process browser processes; the application identifying URL and page source content of each process; and the application preserving state information for at least the browser process in a login state.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
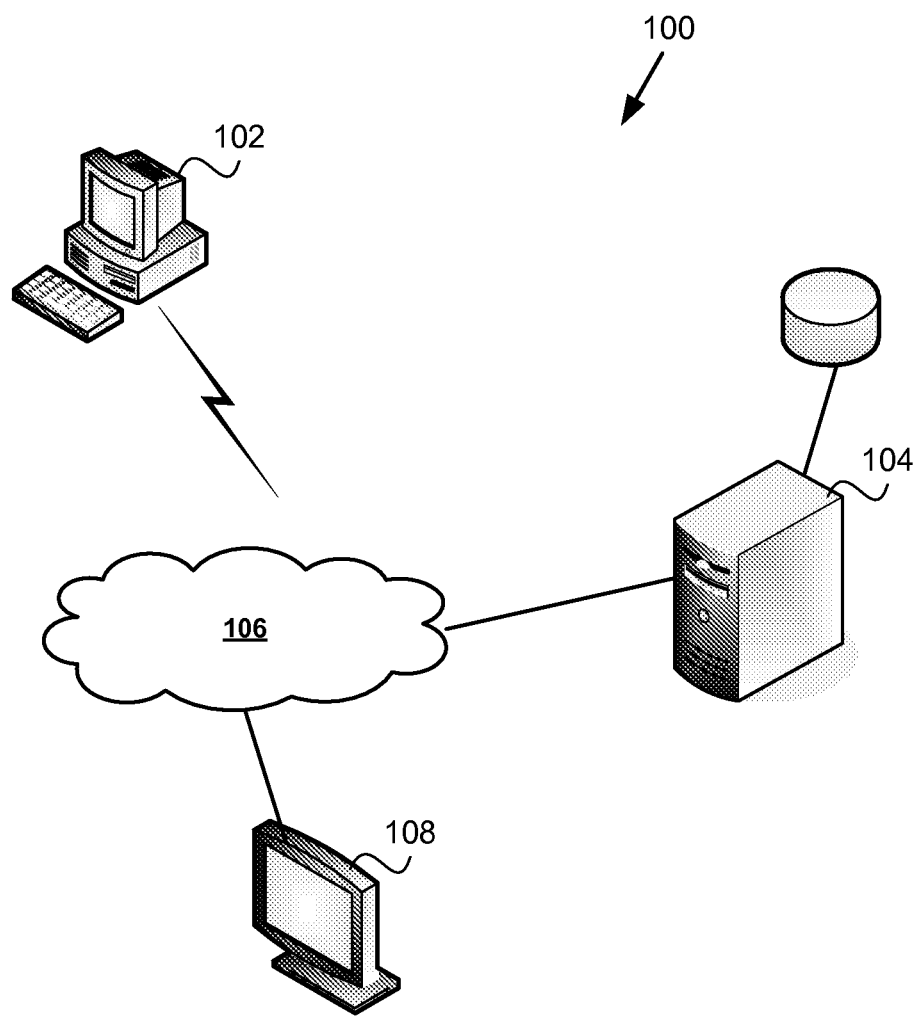
FIG. 1 illustrates an exemplary system within which embodiments of the invention may be implemented.

Embodiments of the present invention relate to electronic security. In order to provide a context for describing embodiments of the present invention, embodiments of the invention will be described herein with reference to a user logging into a bank web site.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Known attempts to combat fraud are vulnerable because they rely upon the user to make a judgment about whether the site being accessed is the correct site. Some solutions attempt to warn the user, and some do not. The user, however, retains the ability to continue in the face of warnings. Non-technical members of the public are particularly at risk. They might not be diligent, or even understand what they are supposed to do. Even for those who try, an attacker can spin a story that will trick the user into ignoring the proper procedure. People are not computing machines, and we are all vulnerable to psychological manipulation. The challenge, then, is to make it impossible for the user to disclose sensitive information to the wrong server. The solution to phishing and MITM attacks, according to embodiments of the present invention, is to take decision making out of the hands of the user.

According to embodiments of the invention, an application, herein referred to as pmaster.exe, resides on memory associated with a user's computing device. The memory may be a USB flash memory fob, a hard drive, or the like. Pmaster.exe is programmed to: identify the browser processes running on the user's machine; read the URL and page source (html, etc.) currently on display in each browser; identify specific keywords, fields, etc., in page source; kill browser processes; and start new browser processes to specific URLs. Pmaster.exe has access to and/or cooperates with: preset/configurable URLs (over SSL) to trusted sites; associated trusted root certificates; and associated large secrets (3DES keys). According to some embodiments, Pmaster.exe does not make any network connections itself; it knows how to make browsers do the work.

In a specific example, a user begins browsing the web by clicking on a link in an email from her bank, which possibly could be a link to a phishing site. The user decides to login to thereby perform some transactions. Upon clicking "Login," a dialog box tells the user to insert her USB fob and double click on pmaster.exe. Pmaster opens as a new process and checks other processes running on the computer, identifying which ones are browser processes. Pathmaster.exe: examines the URLs and source pages that are rendered on each browser; kills all browsers (in case they are phishing sites ready to pop up and trick the user); asks for the user's PIN; launches a browser, tailors its behavior (within certain perimeters) based on information from original selected browser; opens a session (over SSL) with the URL; and submits the PIN and large secret to the server. Pmaster.exe then exits.

The user is now free to interact with the bank site. In this example, the user cannot be cajoled into releasing authentication information to a fake bank site. Pmaster.exe alone knows the large secret and will provide it only to the genuine site. A fraudster can acquire only the user's PIN, and, because the site provides instruction, there is no training required.

In specific embodiments, the "associated large secrets" are 3DES keys. These constitute a second authentication factor, in addition to the PIN. The 3DES keys can be used either simply as unguessable passwords, or for encryption. For example, the PIN may modify the 3DES key, and the resulting key be used to sign a challenge.

The "associated trusted certificates" are there in case a server needs to update the client or wants to direct the pmaster.exe application to do something that is not within its brief For example, since the bank's Web site needs to change its internal structure often, a trusted URL will probably be a high level domain like https:anybank.com. Nonetheless, the bank Web site might eventually want the user to login to an entirely different URL (a new domain) that was not preconfigured. This request can be signed, in a hidden form field that is read by pmaster.exe.

In a realistic preamble to the sensitive session, the user has browsed to a certain part of the Web site and established a certain state in the technical sense—with cookies, html fields, etc. The user has indicated that she wants to check her balance, rather than transfer money. When she has logged in, she should go straight to the page and context that she is expecting. When pmaster.exe enumerates the existing browser processes, it reads the current URL and html source for each. When it finds a login page, there are various ways that it can proceed. It can, for example, read state information from the page. Preferably, the server has identified state information using keywords in hidden form fields. This information will include the subpath from the trusted high-level URL. Then kill all browser processes and fire up a new one, to the desired URL, with requisite state information. If the state information was in persistent cookies (since login has not taken place, this is safe), then apart from the subpath of the URL, state is handled automatically.

Having described embodiments of the invention generally, attention is directed to FIG. 1, which depicts an exemplary system 100 according to embodiments of the invention. Those skilled in the art will appreciate that the system 100 is merely exemplary of a number of possible system embodiments. The system 100 includes a user computer 102 and a secure resource 104 that the user desires to access via a network 106.

Operating on the user computer is an application operating in accordance with the present invention. The application includes or has associated therewith pre-defined URLs for trusted sites, together with trusted root certificates and security keys for each. The security keys may be Triple Data Encryption Standard (3DES or TDES) ciphers, Advanced Encryption Standard (AES) ciphers, and/or the like.

The system 100 may include a fraudster's computer 108. The fraudster may attempt to acquire the user's secure information via a MITM attack or via phishing. According to embodiments of the invention, however, both attempts would fail to access the secure resource 104, since access would require the fraudster having the security key, which the user is prevented from disclosing in accordance with the teachings herein.

Figure 2:
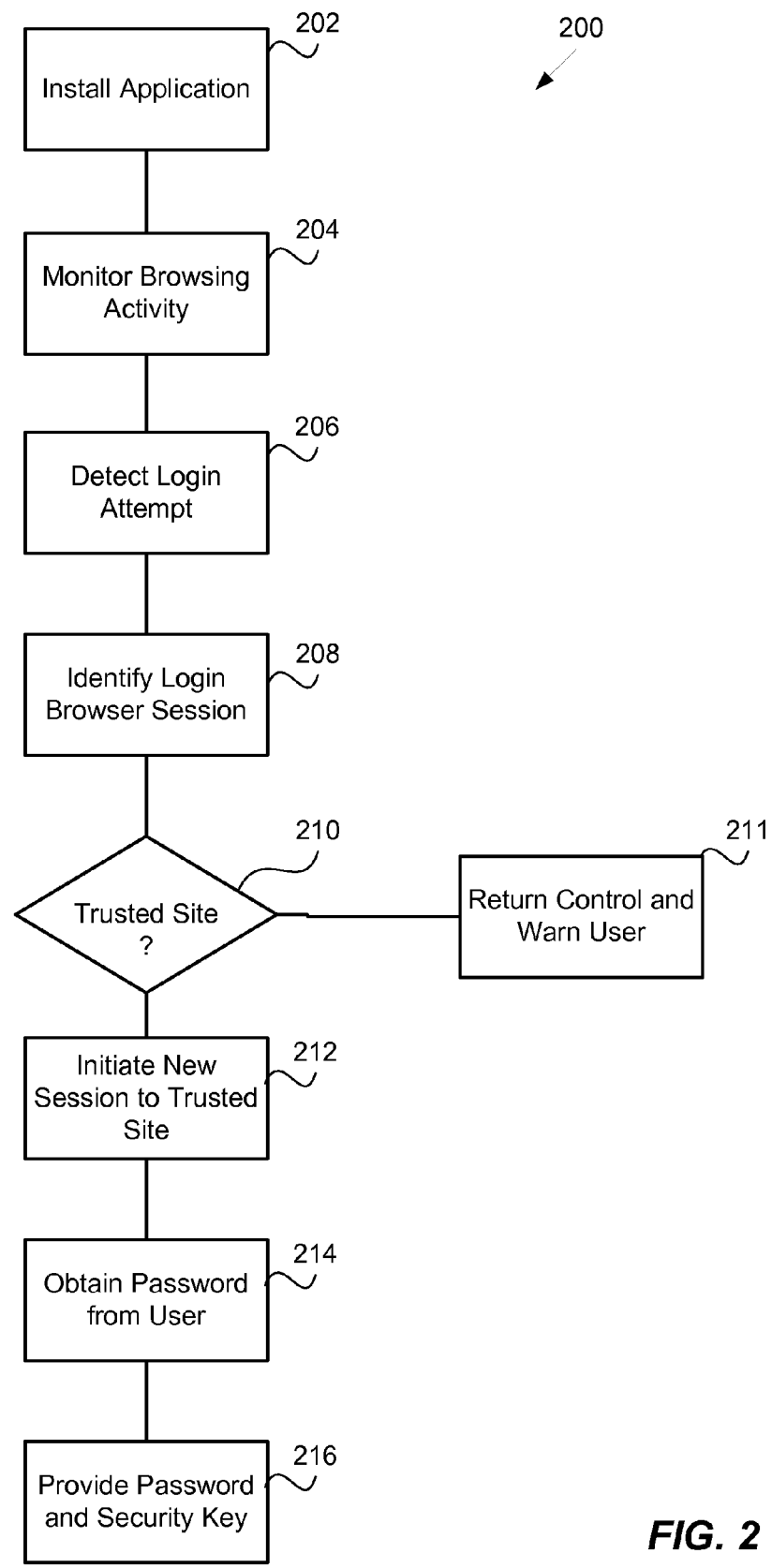
FIG. 2 depicts an exemplary method according to embodiments of the present invention, which method may be implemented in the system of FIG. 1.

Having described a system according to embodiments of the invention, attention is directed to FIG. 2, which depicts an exemplary method 200 according to embodiments of the invention. The method may be implemented in the system 100 of FIG. 1 or other appropriate system. Those skilled in the art will appreciate that the method 200 is merely exemplary of a number of possible method embodiments and that other exemplary methods may include more, fewer, or different steps than those illustrated and described herein.

The method begins at block 202 at which an application that operates in accordance with embodiments of the present invention is installed on the user's computer. The application may be a plug-in, configured to operate in cooperation with a web browser, or may be a standalone application. In some embodiments, the application includes multiple components, one of which operates continuously to monitor web browsing activity and one of which is user initiated at an appropriate time, as will be described hereinafter. The application may reside on a hard drive or other memory (e.g., solid state memory) associated with the user's computer, or may reside on portable memory that the user interfaces with the computer at an appropriate time. Many such embodiments are possible.

At block 204, the application or sub-process of the application monitors the user's browsing activity. At block 206, the application recognizes an attempt by the user to log into a secure resource. In alternative embodiments, rather than having an application monitoring user activity, the secure resource requires its authorized users to use the application described herein to access the site. When an authorized user attempts to log in, the resource directs the user to log in using the application. Other examples are possible.

At block 208, the application identifies browser process running on the computer and searches for the one in which the user is attempting a log in. This may be accomplished by, for example, isolating a URL and key words in page source, comparing the URL to predefined URLs, and/or the like.

At block 210, the application determines whether the login session is an attempt to log into a trusted site. If not, the application may return control to the user, perhaps warning the user to confirm certain details before completing the login process. This takes place at block 211. Otherwise, at block 212, the application initiates a new browser session with the trusted site using a predefined URL to do so. In doing so, the application also may terminate other browser sessions. Before doing so, the application may store state information for one or more browser sessions, including the one with the secure resource, to thereby return the user to the same state once the trusted login process is complete.

At block 214, the application obtains the user's password (i.e., PIN) for the site. It then uses the password and security key for the site to log the user into the site. Upon success, the application returns control to the user, by placing the browser session into the previous state, post-login, and resumes monitoring.

In an alternative example, rather than kill all existing browsers, pmaster.exe could kill only the other browser processes, leaving the (apparently) valid one, and then re-target that browser to the desired URL.

In some embodiments, Server-Token Lockstep is incorporated, thereby rendering the user immune to keystroke loggers and malicious programs, as SecurID or a smart card.

In exemplary embodiments, a browser plugin is not used and network connections are not made by pmaster.exe. As such, it presents few IT challenges—it is simple to install. The effort required by the end user is very small—it integrates smoothly with browsing.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A computer-implemented method comprising:
   monitoring a browser process executed by a computing device, the monitoring performed by a first application that executes on the computing device;
   detecting an attempt by a user to log into a website via the browser process, wherein the detecting is performed by the first application;
   in response to the attempt, instructing the user to activate a second application that resides in portable memory separate from the computing device, wherein the second application comprises a security key associated with a trusted website;
   determining whether or not the attempt is an attempt to log into the trusted website;
   when it is determined that the attempt is an attempt to log into the trusted website,
      reading state information from the browser process and direct the user to a new browser process having the same state as the user was in the browser process prior to determining that the attempt is an attempt to log into the trusted website, and
      the second application providing the security key; and
   supplying to the trusted website, via the new browser process, a trusted root certificate associated with the trusted website to direct the second application to login to a non-preconfigured website associated with the trusted website.

2. The method of claim 1, further comprising:
   terminating the browser process in response to determining that the attempt is an attempt to log into the trusted website; and
   initiating the new browser process on the computing device.

3. The method of claim 2, further comprising supplying to the trusted website via the new browser process the security key associated with the trusted website, the security key including an Advanced Encryption Standard (AES) cipher or a Triple Data Encryption Standard (TDES) cipher.

4. The method of claim 2, further comprising:
   receiving a password from the user for accessing the trusted website; and
   supplying the password together with the security key to the trusted website via the new browser process.

5. The method of claim 4, wherein the portable memory stores the trusted root certificate.

6. The method of claim 2, further comprising reading state information from the browser process and storing the read state information, wherein the new browser process is initiated using the stored state information such that the user is taken to the same state in the new browser process as the user was in in the browser process prior to determining that the attempt is an attempt to log into the trusted website.

7. The method of claim 1, further comprising:
   when it is determined that the attempt is not an attempt to log into the trusted website, performing one or more of returning control to the user and communicating a warning to the user.

8. The method of claim 1, further comprising:
   initiating a new browser process on the computing device using a predefined identifier associated with the trusted web site in response to determining that the user is attempting to log into the trusted web site, wherein the predefined identifier is a URL of the trusted website.

9. The method of claim 1, wherein the determining further comprises identifying the browser process as being in a log-in state with a secure resource and directing the browser process determined to be in the log-in state to a predefined Uniform Resource Locator (URL) of the trusted web site.

10. The method of claim 1, wherein determining whether or not the attempt is an attempt to log into the trusted website includes scanning, by the first application, one or more browser processes executed by the computing device for a predefined Uniform Resource Locater (URL).

11. A tangible non-transitory computer-readable medium having stored thereon computer-executable instructions that, when executed, cause a computing device to perform operations including:
   monitor a browser process executed by the computing device;
   detect an attempt by a user to log into a website via the browser process;
   in response to the attempt, instruct the user to interface portable memory to the computing device, wherein the portable memory comprises a security key associated with a trusted website;
   determine whether or not the attempt is an attempt to log into the trusted website;
   when it is determined that the attempt is an attempt to log into the trusted website,
      cause the computing device to initiate a new browser process using state information read from the browser process such that the user is taken to the same state in the new browser process as the user was in the browser process prior to determining that the attempt is an attempt to log into the trusted website, and cause the computing device to provide the security key to the trusted website; and supply to the trusted website, via the new browser process, a trusted root certificate associated with the trusted website to login to another website via a request signed by the trusted root certificate.

12. The tangible non-transitory computer-readable medium of claim 11, wherein the instructions, when executed, further cause the computing device to terminate the browser process when it is determined that the attempt is an attempt to log into the trusted website.

13. The tangible non-transitory computer-readable medium of claim 11, wherein the security key comprises an Advanced Encryption Standard (AES) cipher or a Triple Data Encryption Standard (TDES) cipher.

14. The tangible non-transitory computer-readable medium of claim 11, wherein causing the computing device to provide the security key to the trusted website further comprises receiving a password from the user and cause the computing device to provide the password received by the user and the security key stored in the portable memory to the trusted website to log-in the user.

15. The tangible non-transitory computer-readable medium of claim 11, wherein the instructions that cause the computing device to determine whether or not the attempt is an attempt to log into the trusted website cause the computing device to scan one or more browser processes for a predefined Uniform Resource Locater (URL).

16. A computing device comprising:
a processor that is configured to:
monitor a browser process executed by the computing device;
detect an attempt by a user to log into a website via the browser process;
in response to the attempt, instruct the user to interface portable memory to the computing device, wherein the portable memory comprises a security key associated with a trusted website;
determine whether or not the attempt is an attempt to log into the trusted website;
when it is determined that the attempt is an attempt to log into the trusted website, causing the computing device to
provide the security key to the trusted website;
terminate the browser process in response to determining that the attempt is an attempt to log into the trusted website;
initiate a new browser process on the computing device, and
read state information from the browser process and storing the read state information, wherein the new browser process is initiated using the stored state information such that the user is taken to the same state in the new browser process as the user was in the browser process prior to determining that the attempt is an attempt to log into the trusted website; and
supply to the trusted website, via the new browser process, a trusted root certificate associated with the trusted website to login to a non-preconfigured website associated with the trusted website.

17. The computing device of claim 16, wherein the security key comprises an Advanced Encryption Standard (AES) cipher or a Triple Data Encryption Standard (TDES) cipher.

18. The computing device of claim 16, wherein determining whether or not the attempt is an attempt to log into the trusted website includes scanning one or more browser processes for a predefined Uniform Resource Locater (URL).

* * * * *